(12) United States Patent
Sutton et al.

(10) Patent No.: US 9,399,513 B2
(45) Date of Patent: Jul. 26, 2016

(54) CONSTANT VELOCITY JOINT WITH CONTROL MECHANISM

(71) Applicant: Bell Helicopter Textron Inc., Fort Worth, TX (US)

(72) Inventors: Drew A. Sutton, Watauga, TX (US); Christopher Foskey, Keller, TX (US); Dudley Smith, Arlington, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 906 days.

(21) Appl. No.: 13/673,475

(22) Filed: Nov. 9, 2012

(65) Prior Publication Data

US 2014/0133979 A1 May 15, 2014

(51) Int. Cl.
| | |
|---|---|
| *B64C 27/37* | (2006.01) |
| *F16D 3/30* | (2006.01) |
| *B64C 27/41* | (2006.01) |
| *F16D 3/33* | (2006.01) |
| *B64C 27/32* | (2006.01) |

(52) U.S. Cl.
CPC ............... *B64C 27/37* (2013.01); *B64C 27/32* (2013.01); *B64C 27/41* (2013.01); *F16D 3/30* (2013.01); *F16D 3/33* (2013.01)

(58) Field of Classification Search
CPC ........ B64C 27/41; B64C 27/37; B64C 27/32; F16D 3/30; F16D 3/33
USPC .......................................... 464/125, 126, 136
See application file for complete search history.

(56) References Cited

U.S. PATENT DOCUMENTS

| | | | |
|---|---|---|---|
| 3,517,528 A | 6/1970 | Eccher | |
| 3,965,700 A | 6/1976 | Nicoletti | |
| 5,954,586 A | 9/1999 | Kirson | |
| 7,442,126 B2 | 10/2008 | Thompson | |
| 2003/0178528 A1 | 9/2003 | Zoppitelli et al. | |
| 2003/0222171 A1* | 12/2003 | Zoppitelli | B64C 29/0033 244/10 |
| 2004/0106458 A1 | 6/2004 | Thompson | |
| 2008/0267778 A1 | 10/2008 | Stamps et al. | |

FOREIGN PATENT DOCUMENTS

| | | |
|---|---|---|
| WO | 2013/061348 A1 | 5/2013 |
| WO | 2013061348 A1 | 5/2013 |

OTHER PUBLICATIONS

Office Action in related Canadian Application No. 2,832,784, dated Mar. 18, 2015, 4 pages.
Office Action in related Chinese Application No. 201310553025.X, dated Jul. 30, 2015, 9 pages.
European Search Report in related European Application No. 13172496.5, dated Jan. 24, 2013, 3 pages.
Examination Report in related European Application No. 13172496.5, dated Dec. 8, 2014, 5 pages.
Official Action in related European Application No. 13172496.5, dated Feb. 19, 2014, 7 pages.

* cited by examiner

*Primary Examiner* — Richard Edgar
(74) *Attorney, Agent, or Firm* — Bell Helicopter Textron Inc

(57) ABSTRACT

According to one embodiment, a constant velocity (CV) joint includes a first yoke, a second yoke, and a control mechanism. The first yoke is configured to be rotatably coupled to an input device about a first axis and configured to receive the input device through a first opening. The second yoke is rotatably coupled to the first yoke about a second axis and rotatably coupled to an output device about a third axis. The control mechanism is adapted to constrain the first yoke and the second yoke so as to achieve a substantially CV characteristic between the input device and the output device.

30 Claims, 12 Drawing Sheets

CONSTANT VELOCITY JOINT WITH CONTROL MECHANISM

TECHNICAL FIELD

This invention relates generally to constant velocity joints, and more particularly, to a constant velocity joint with control mechanism.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a constant velocity joint. A technical advantage of one embodiment may include the capability to reduce friction and wear in a CV joint. A technical advantage of one embodiment may include the capability to reduce the number of bearings in a CV joint.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
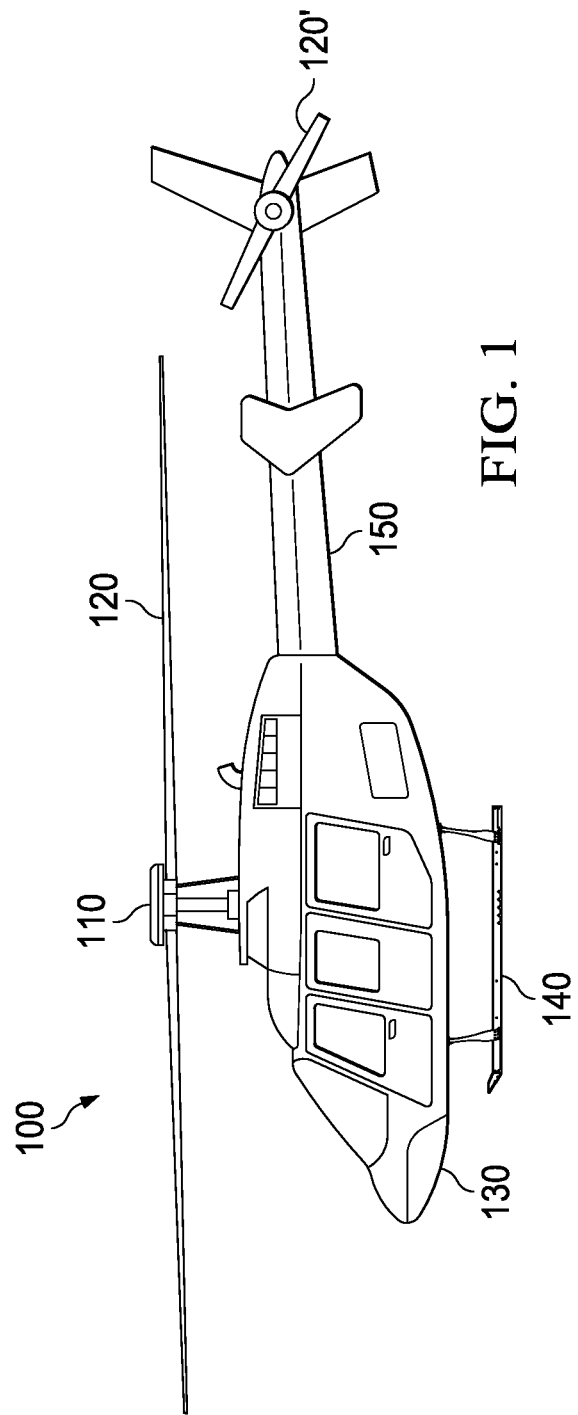
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
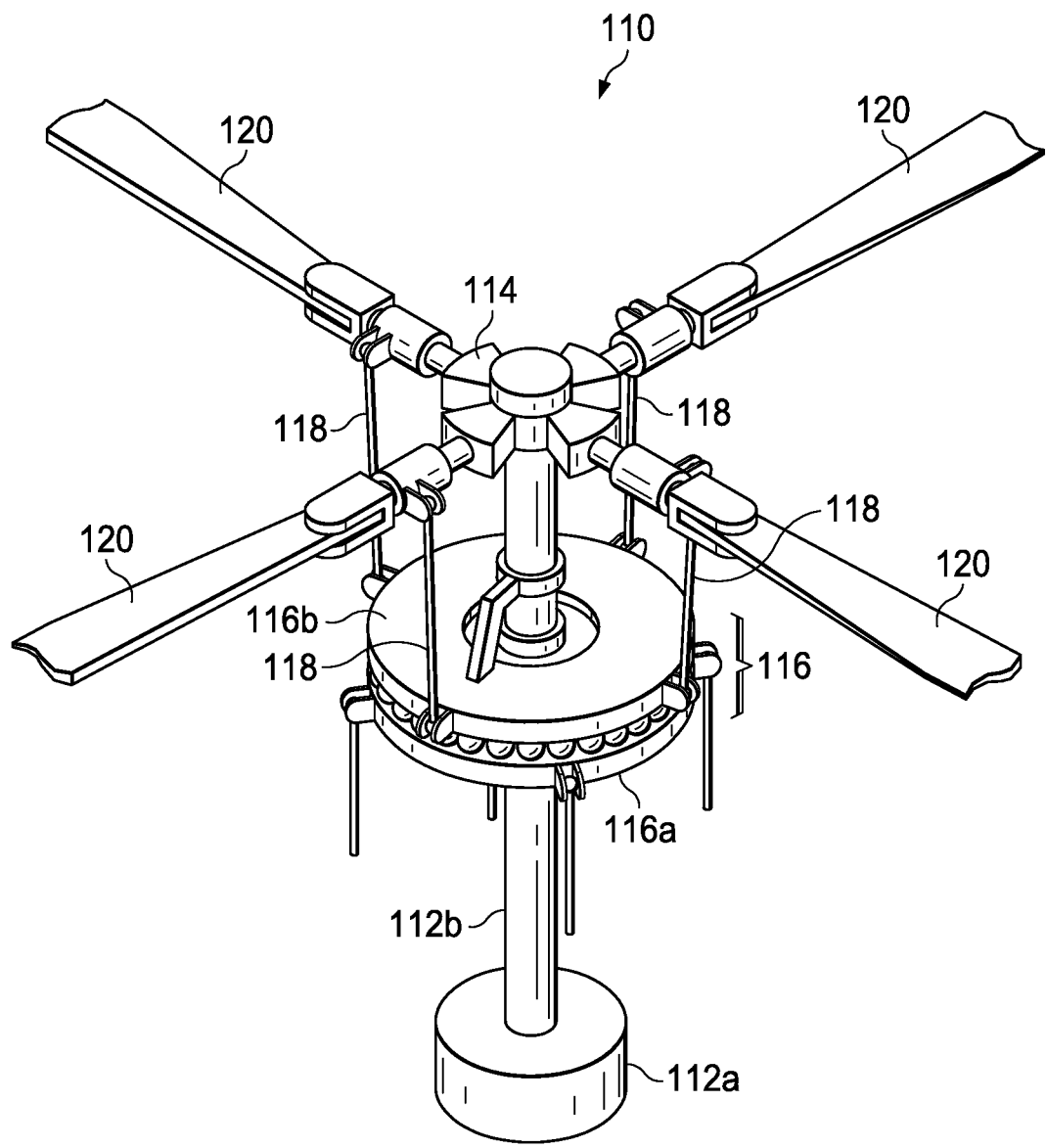
FIG. 2 shows the rotor system and blades of the rotorcraft of FIG. 1 according to one example embodiment.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

In the example of FIG. 2, hub 114 may be coupled to drive shaft 112b such that drive shaft 112b transmits torque to hub 114. Hub 114, however, may be moved in a variety of positions relative to drive shaft 112b. For example, pitch links 118 may move hub 114 relative to drive shaft 112b. Moving hub 114 relative to drive shaft 112b may change the angular relationship between hub 114 and drive shaft 112b, which may cause hub 114 and drive shaft 112b to phase shift. Hub 114 and drive shaft 112b may phase shift, for example, if they are not maintained at constant velocity during rotation.

Accordingly, teachings of certain embodiments recognize that a constant-velocity (CV) joint may be provided between hub 114 and drive shaft 112b to allow drive shaft 112b to transmit power through a variable angle, at constant speed, without an appreciable increase in friction or play.

In general, a CV joint may refer to a type of mechanism that connects two rotating components making an angle with one another. This angle may vary during service, such as may be the case with the angle between hub 114 and drive shaft 112b. Teachings of certain embodiments recognize that a CV joint may mechanically couple an input shaft to an output shaft in such a way that torque may be transmitted from the input shaft to the output shaft whilst maintaining a substantially CV characteristic. A CV characteristic refers to a characteristic wherein the instantaneous angular velocity of the input shaft is substantially matched to the instantaneous angular velocity of the output shaft throughout a full rotation of the shafts. It is to be understood that the CV characteristic may represent a design goal, and various embodiments may achieve this characteristic to a greater or lesser degree based on parameters, which may include mechanical and structural variations in the assembly. Thus, a joint may maintain a substantially CV characteristic even if the angular velocities do not perfectly match. In some embodiments, a CV joint may maintain a substantially CV characteristic despite variations in angle between the input and output shafts.

Figure 3:
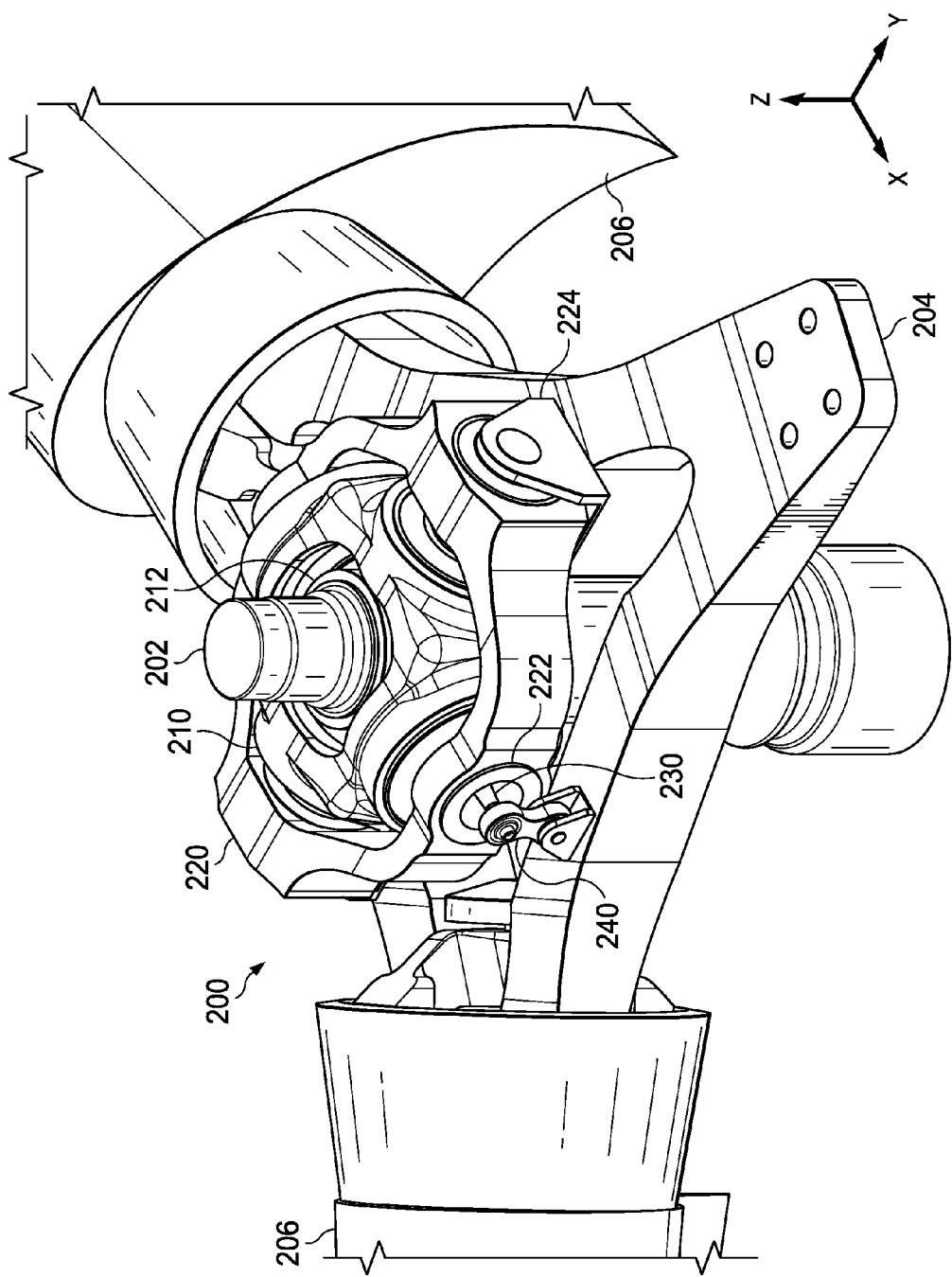
FIG. 3 shows a constant velocity (CV) joint according to one example embodiment.

FIG. 3 shows a CV joint 200 according to one example embodiment. In the example of FIG. 3, CV joint 200 is shown coupling a drive shaft 202 to a hub 204, which features blade portions 206. Drive shaft 202, hub 204, and blade portions 206 may correspond to drive shaft 112b, hub 114, and blades 120 of FIGS. 1 and 2.

CV joint 200 features an inner yoke 210, an outer yoke 220, a positioning linkage 230, and linkage 240. Teachings of certain embodiments recognize that positioning linkage 230 and linkage 240, in combination, may provide a control mechanism that maintains a CV characteristic between drive shaft 202 and hub 204.

As shown in FIG. 3, inner yoke 210 is positioned about drive shaft 202. In this example, inner trunion 212 couples inner yoke 210 to drive shaft 202 and allows inner yoke 210 to rotate about a first axis relative to drive shaft 202 and inner trunion 212. As shown in FIG. 3, this first axis of rotation may substantially intersect and/or be substantially normal to the axis of rotation of drive shaft 202.

Teachings of certain embodiments recognize that inner yoke 210 may include an opening for receiving drive shaft 202. In this example, positioning linkage 230 and linkage 240 are positioned away from the opening through inner yoke 210 so as not to interfere with the opening receiving drive shaft 202. Teachings of certain embodiments recognize that such an arrangement may represent an improvement over CV joints that feature control mechanisms that interfere with the ability to receive a drive shaft through its center.

Outer yoke 220 is positioned about inner yoke 210. In this example, yoke coupler 222 couples outer yoke 220 to inner yoke 210 and allows outer yoke 220 to rotate about a second axis relative to inner yoke 210 and yoke coupler 222. In some embodiments, yoke coupler 222 is positioned inside of respective openings of inner yoke 210 and outer yoke 220 so as to maintain inner yoke 210 and outer yoke 222 as substantially coaxial. As shown in FIG. 3, this second axis of rotation may substantially intersect and/or be substantially normal to the first axis of rotation.

Hub 204 is positioned about drive shaft 202. Hub couplers 224 couple outer yoke 220 to hub 204 and allow outer yoke 220 to rotate about a third axis relative to hub couplers 224 and hub 204. As shown in FIG. 3, this third axis of rotation may substantially intersect and/or be substantially normal to the second axis of rotation.

Positioning linkage 230 and linkage 240 may provide a control mechanism that maintains a CV characteristic between drive shaft 202 and hub 204. In the example of FIG. 3, positioning linkage 230 is coupled to inner trunion 212 and extends through yoke coupler 222, which is positioned inside of respective openings of inner yoke 210 and outer yoke 220. Linkage 240 is coupled to positioning linkage 230 opposite inner trunion 212. In particular, linkage 240 couples positioning linkage 230 to hub 204 such that movements of hub 204 result in deflections of positioning linkage 230. Positioning linkage 230 and linkage 240 will be described in greater detail with regard to FIGS. 5A and 5D.

Figure 4A:
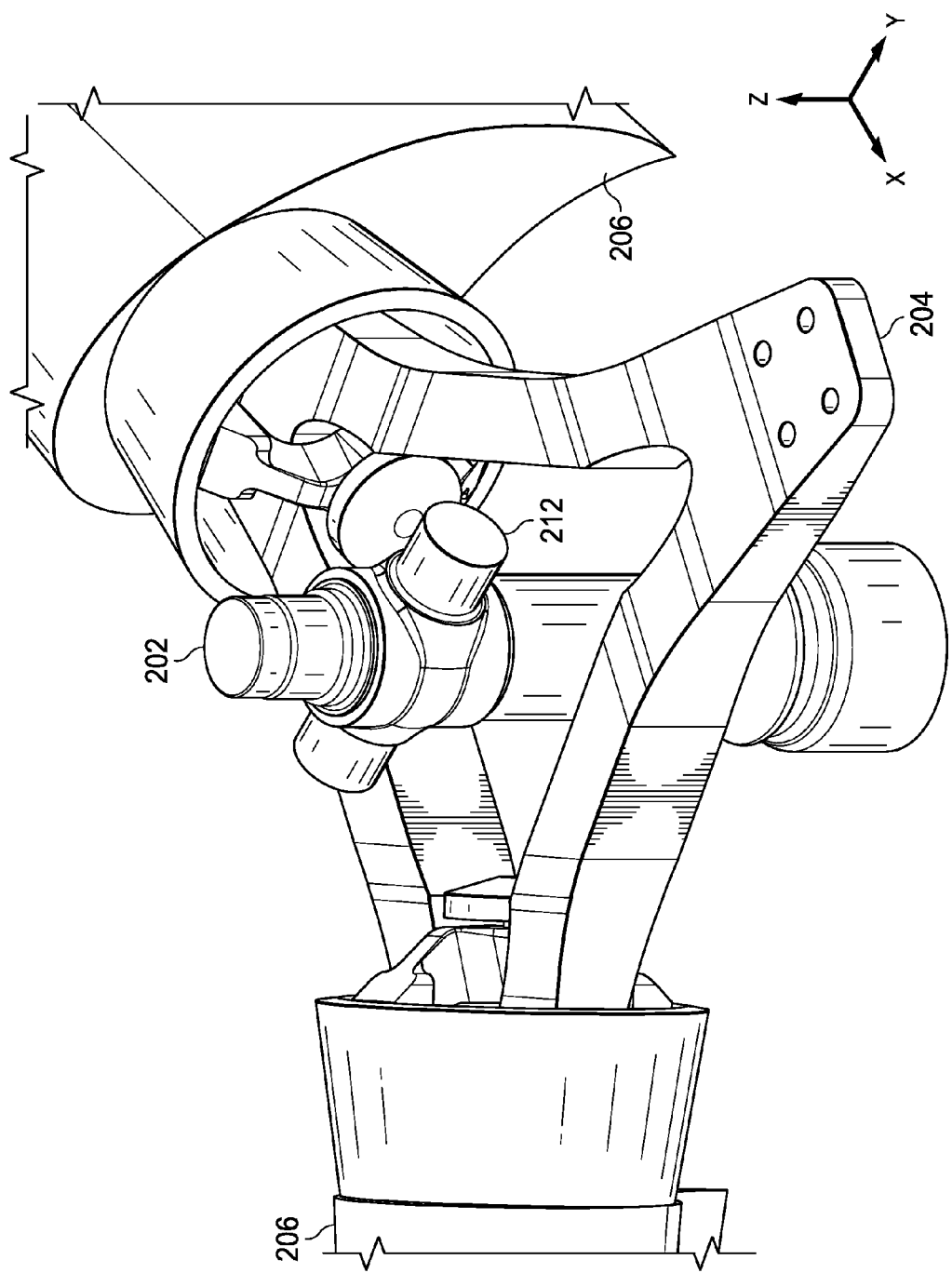
FIGS. 4A-4E show disassembled views of the CV joint of FIG. 3.
Figure 4B:
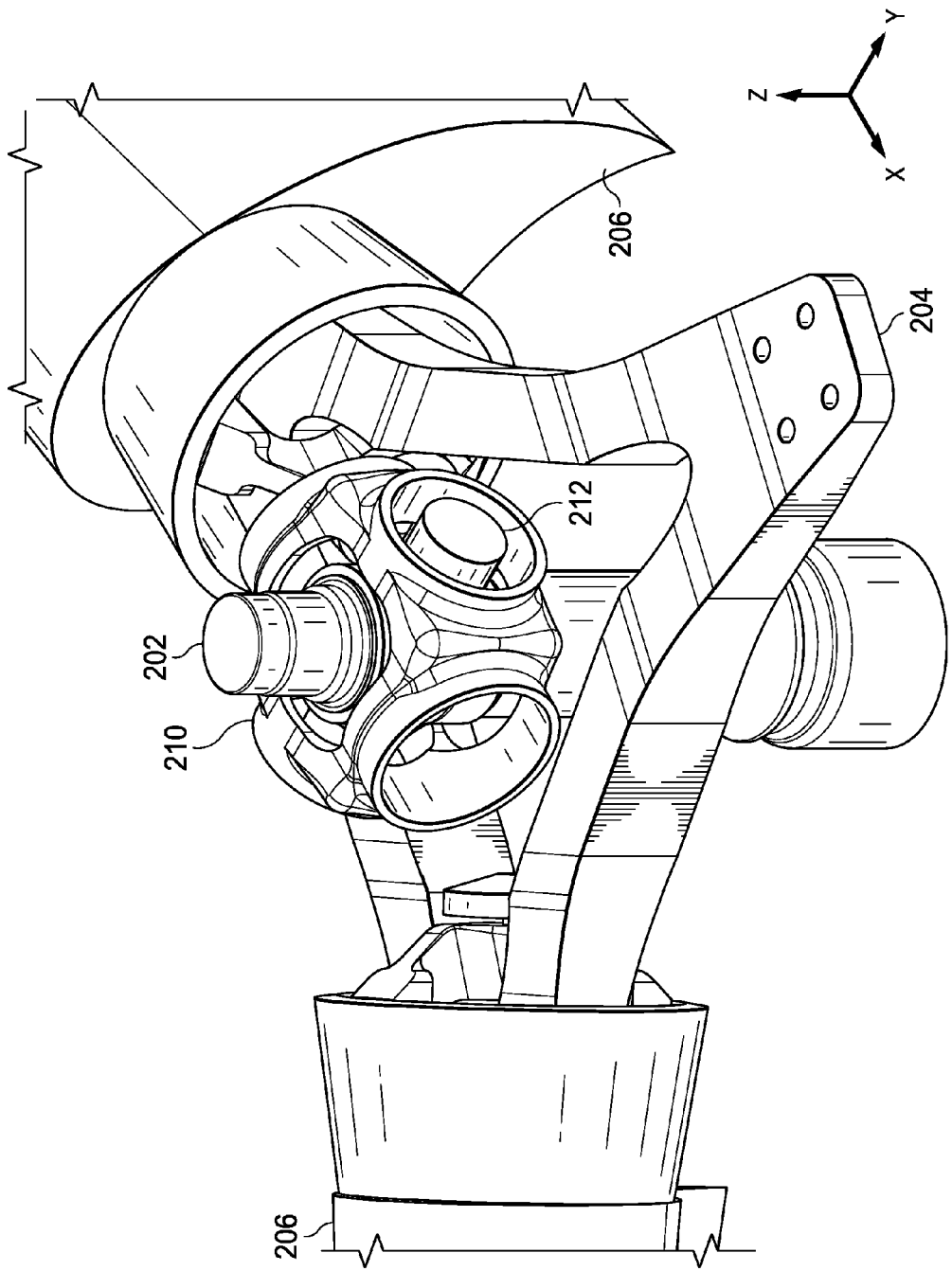

FIGS. 4A-4E show disassembled views of the CV joint 200 of FIG. 3. FIG. 4A shows drive shaft 202 and hub 204 with CV joint 200 removed. As seen in FIG. 4A, inner trunion 212 is positioned around drive shaft 202. In FIG. 4B, inner yoke 210 is positioned around inner trunion 212. Inner trunion 212 includes substantially cylindrical protrusions that allow inner yoke 210 to rotate about inner trunion 212. In this manner, inner trunion 212 may define the first axis of rotation about which inner yoke 210 may rotate. As shown in FIG. 4B, inner yoke 210 includes openings larger than the outer diameters of inner trunion 212 so as to allow room for bearing material.

Figure 4C:
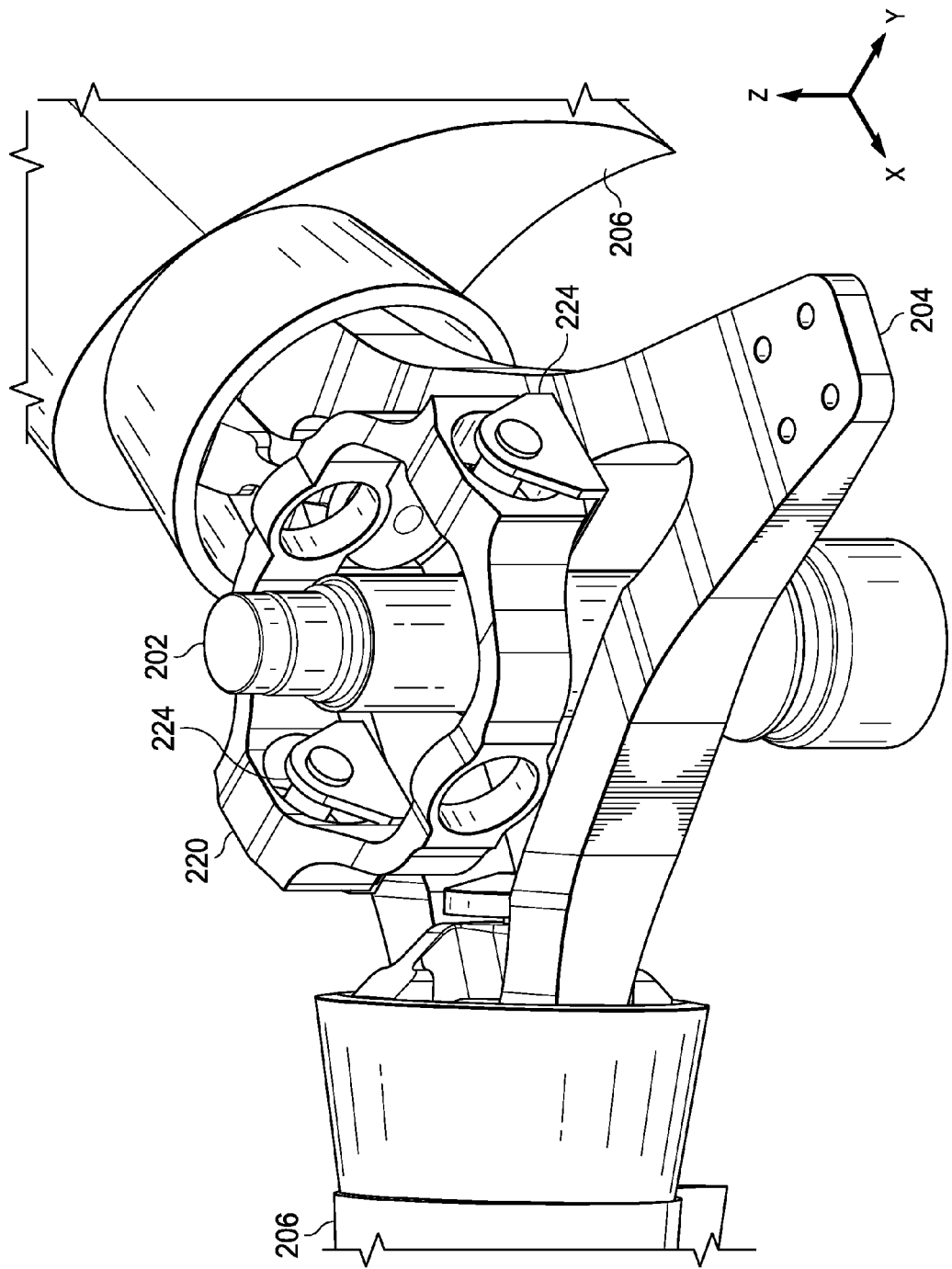

In FIG. 4C, inner yoke 210 and inner trunion 212 are removed, and outer yoke 220 is added. As seen in FIG. 4C, hub couplers 224 couple outer yoke 220 to hub 204. Hub couplers 224 include substantially cylindrical shafts that allow outer yoke 220 to rotate about hub couplers 224. In this manner, hub couplers 224 may define the third axis of rotation about which outer yoke 220 may rotate. As shown in FIG. 4C, outer yoke 220 includes openings larger than the outer diameters of hub couplers 224 so as to allow room for bearing material.

Figure 4D:
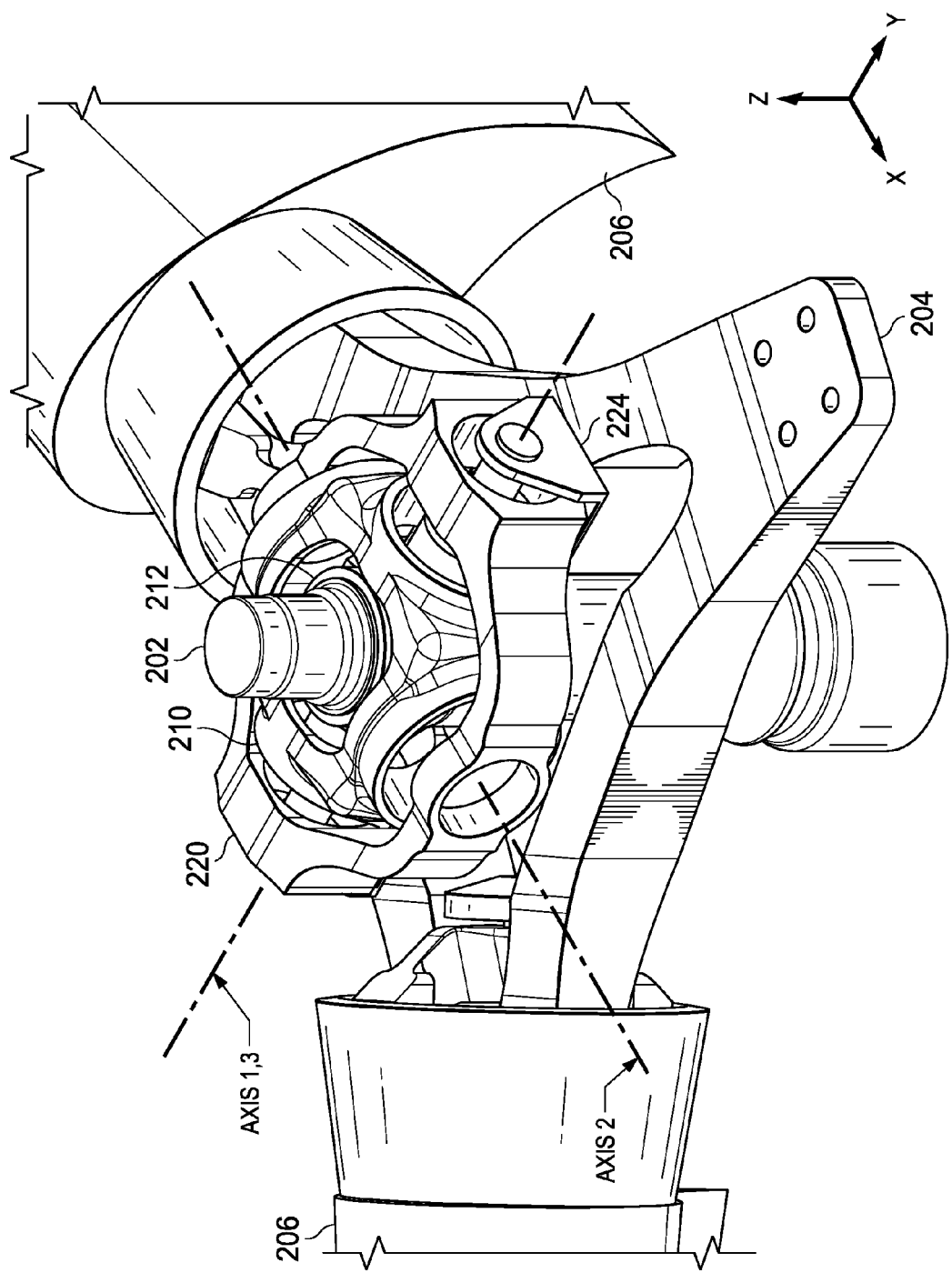
Figure 4E:
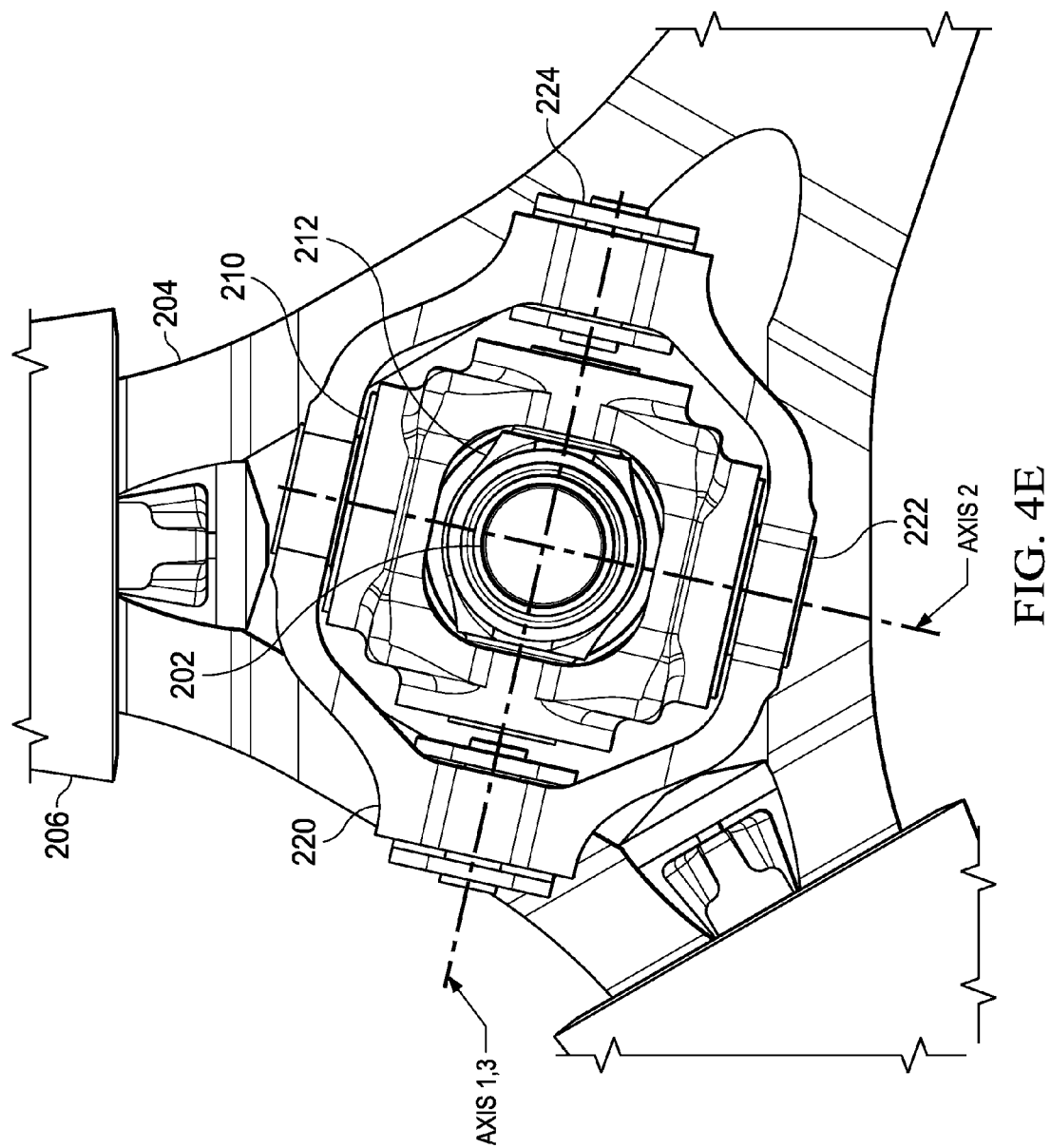

In FIGS. 4D and 4E, both inner yoke 210 and outer yoke 220 are provided. FIG. 4D shows a perspective view of CV joint 200 without yoke coupler 222, and FIG. 4E shows a top view of CV joint 200 with yoke coupler 222. Teachings of certain embodiments recognize that yoke coupler 222 may be provided to couple inner yoke 210 to outer yoke 220 and to allow inner yoke 210 and outer yoke 220 to rotate about the same second axis.

Even with yoke coupler 222, however, movement of inner yoke 210 and outer yoke 220 may be relatively unconstrained. For example, FIG. 4D shows inner yoke 210 and outer yoke 220 positioned such that the first axis is coaxial with the third axis. In this example, inner yoke 210 and outer yoke 220 are free to rotate about the first and third axes unconstrained. If drive shaft 202 and/or hub 204 are deflected at an angle such that the first axis is no longer coaxial with the third axis, the unconstrained motion of inner yoke 210 and outer yoke 220 may prevent the CV joint from maintaining a CV characteristic. Accordingly, teachings of certain embodiments recognize the ability to provide a control mechanism to position inner yoke 210 and outer yoke 220.

Figure 5A:
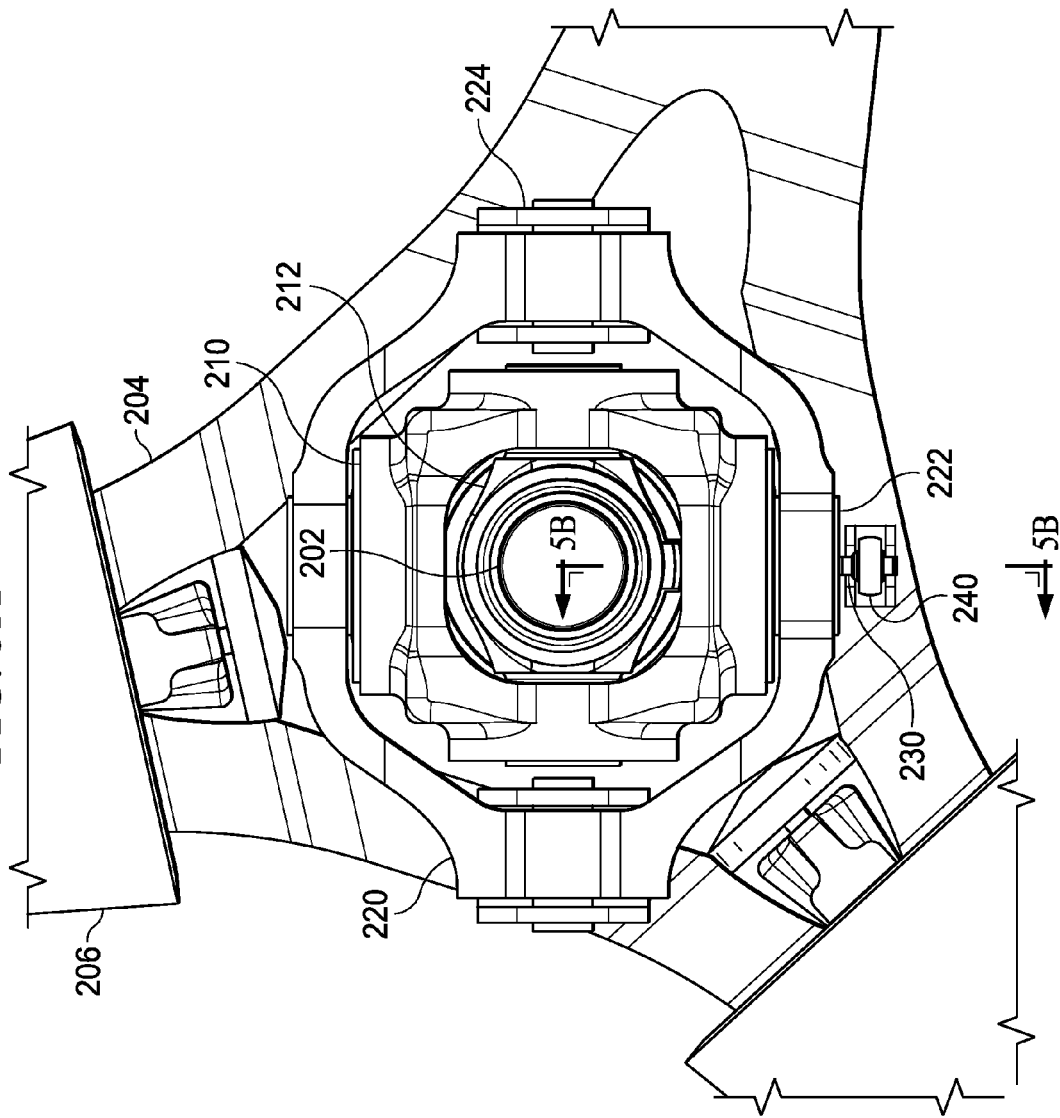
FIGS. 5A-5D show the CV joint of FIG. 3 with a control mechanism.
Figure 5B:
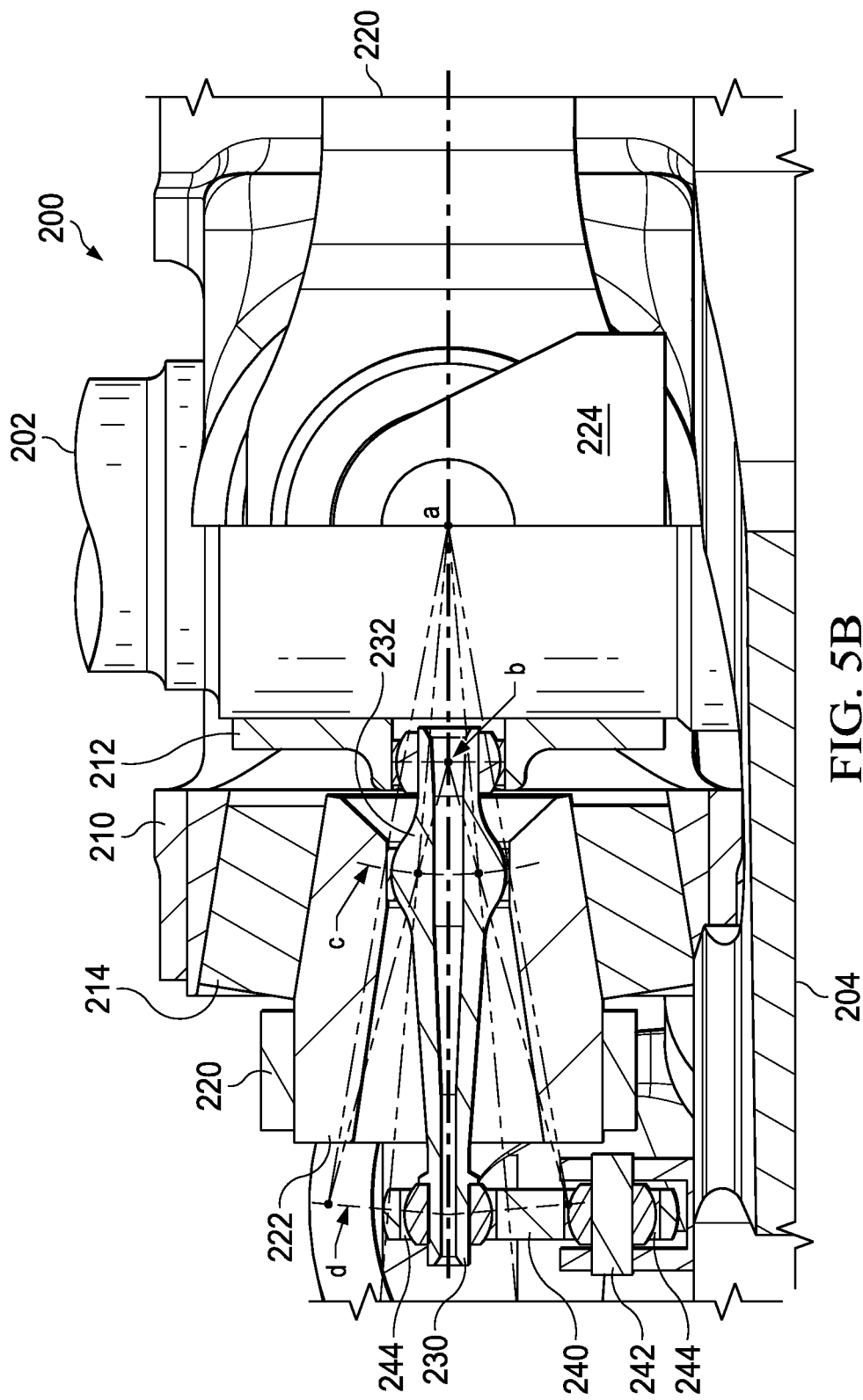
Figure 5C:
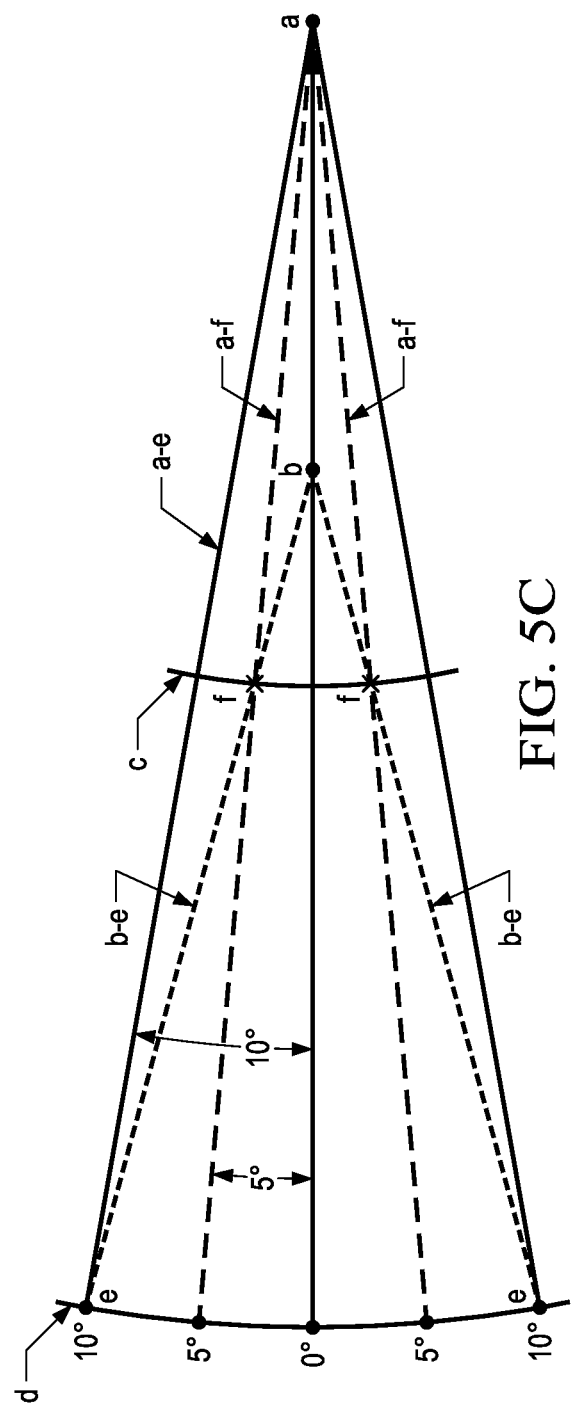
Figure 5D:
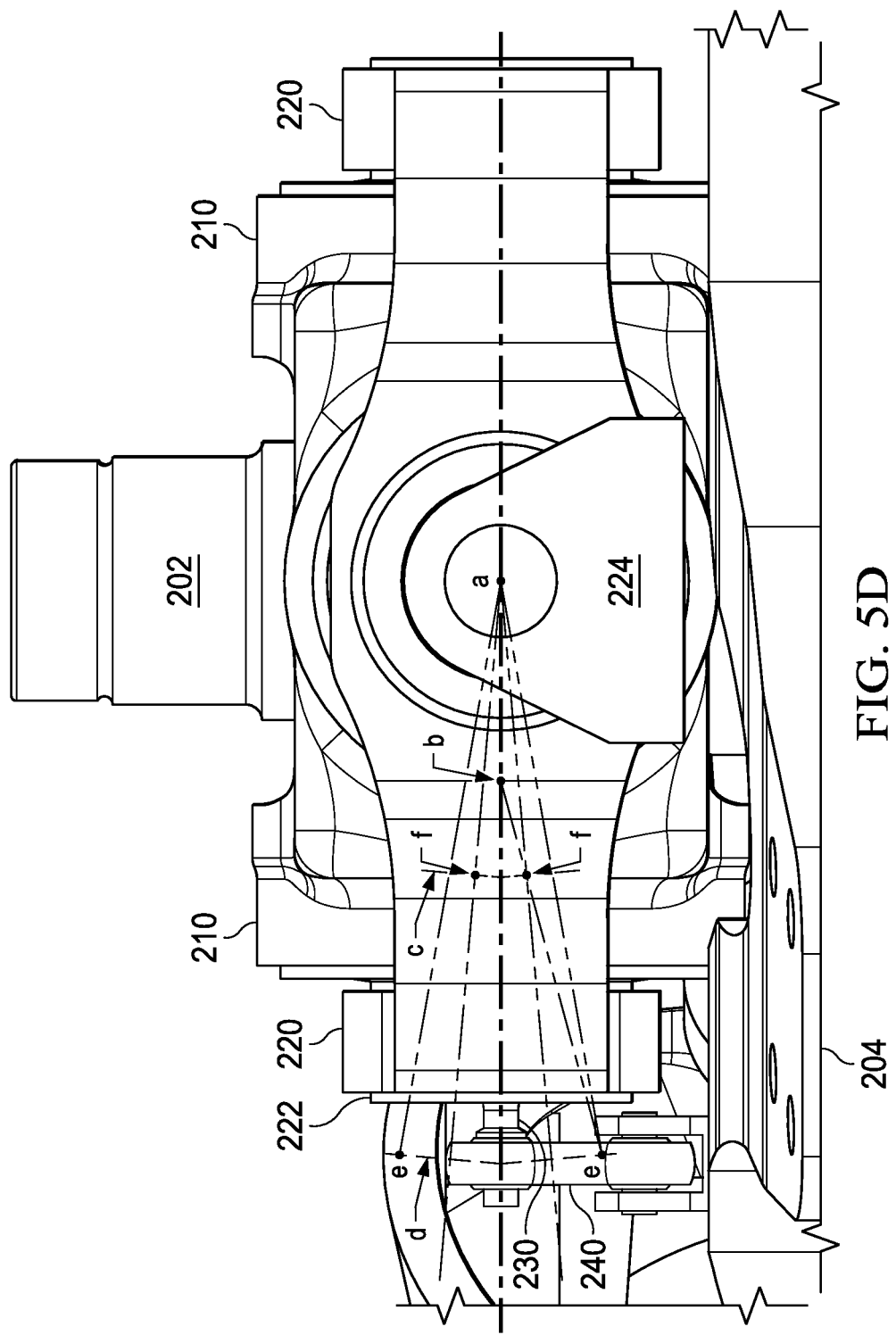

FIGS. 5A-5D show the CV joint 200 of FIG. 3 with a control mechanism. FIG. 5A shows a top view, FIG. 5B shows a cross-section side view, FIG. 5C shows the mathematical relationship between various components according to one example embodiment, and FIG. 5D shows a fully-assembled view of the side view of FIG. 5B.

In some embodiments, positioning linkage 230 and linkage 240 may provide a control mechanism that maintains a CV characteristic between drive shaft 202 and hub 204. In the example of FIG. 5B, positioning linkage 230 is coupled to inner trunion 212 and extends through yoke coupler 222, which is positioned inside of respective openings of inner yoke 210 and outer yoke 220. Linkage 240 is coupled to positioning linkage 230 opposite inner trunion 212. In particular, linkage 240 couples positioning linkage 230 to hub 204 such that movements of hub 204 result in deflections of positioning linkage 230. In the example of FIG. 5B, linkage is coupled to hub 204 by a pin 242 and a bearing liner 244, which receives pin 242, and is coupled to positioning linkage 230 by another bearing liner 244, which receives positioning linkage 230.

As seen in FIGS. 5B-5D, positions a-f represent various locations within CV joint 200. In this example, origin point a is located at the intersection of the first axis, the second axis, the third axis, and the axis of rotation of drive shaft 202. In some embodiments, origin point may be located at the intersection of more, fewer, or different axes than those identified above. In the example of FIGS. 5B-5D, origin point a is located at the intersection of the first and second axes such that rotation of inner yoke 210 about the first axis results in repositioning of the second axis.

Rotation point b refers to a point of rotation of positioning linkage 230. Rotation point b is offset from origin point a. In the example shown in FIG. 5B, rotation point b is coaxial with the second axis. As will be explained in greater detail, however, the second axis may move away from rotation point b as a result of movement of hub 204.

Travel arc c represents a travel path of positioning portion 232. Positioning portion 232 represents a portion of positioning linkage 230 that moves yoke coupler 222 (along with inner yoke 210 and outer yoke 220) as positioning linkage 230 moves. In the example of FIG. 5B, positioning portion 232 is an approximately spherical portion residing within yoke coupler 222.

Travel arc d represents a travel path of the coupling of positioning linkage 230 and linkage 240. As hub 204 moves, linkage 240 moves the end of positioning linkage 230 along travel arc d. The location of the coupling of positioning linkage 230 and linkage 240 may be referred to as point e. Thus, for example, point e moves along travel arc d as hub 204 moves.

Point f represents a location of positioning portion 232. In some embodiments, point f may be coaxial with the second axis. The second axis, as stated above, is an axis of rotation of the outer yoke 220. In the example of FIG. 5B, outer yoke 220 and yoke coupler 220 are both approximately centered about the second axis. In addition, positioning portion 232 is centered within yoke coupler 222 in this example. Therefore, in this example, point f associated with positioning portion 232 is coaxial with the second axis. Because the second axis intersects point a, line a-f is also coaxial with the second axis.

Teachings of certain embodiments recognize the positioning linkage 230 and linkage 240 may position the second axis on the angular bisector for the deflection angle between drive shaft 202 and hub 204 for a range of deflection angels. In the example of FIG. 5C, hub 204 is deflected 10 degrees relative to drive shaft 202. Thus, in this example, hub 204 has moved linkage 240 such that point e is now located at the 10 degree position of travel arc d. Stated another way, the angle between a 0 degree reference line and the line between origin point a and point e is 10 degrees.

When hub 204 is deflected 10 degrees, linkage 240 moves positioning linkage 230. Positioning linkage 230, as stated above, rotates about rotation point b. Thus, the line between reference point b and point e may represent the position of positioning linkage 230.

As positioning linkage 230 rotates about point b, positioning linkage 230 moves point f along travel arc c. As stated above, line a-f is coaxial with the second axis. Therefore, moving point f along travel arc c moves the second axis.

In the example of FIG. 5C, rotation point b is offset from origin point a such that point f resides on the angular bisector line between the 0 degree reference line and line a-e. Therefore, in this example, line a-f bisects the angle between the 0 degree reference line and line a-e. Teachings of certain embodiments recognize that line a-f may bisect the angle between the 0 degree reference line and line a-e for a range of deflection angles. For example, if the deflection angle is reduced to 6 degrees, then the angle between line a-e and line a-f would be approximately 3 degrees. Accordingly, teachings of certain embodiments recognize the capability of positioning linkage 230 and linkage 240 to move inner yoke 210 and outer yoke 220 such that their axis of rotation (the second axis) is positioned in the angular bisector of the deflection angle between drive shaft 202 and hub 204.

Teachings of certain embodiments recognize that positioning inner yoke 210 and outer yoke 220 may allow CV joint 200 to achieve a substantially CV characteristic. In particular, teachings of certain embodiments recognize that center inner yoke 210 and outer yoke 220 along the angular bisector of the cocking angle between drive shaft 202 and hub 204 may allow CV joint 200 to achieve a substantially CV characteristic. In addition, teachings of certain embodiments recognize that positioning linkage 230 and linkage 240 may position inner yoke 210 and outer yoke 220 while CV joint 200 is at zero cocking angle.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub;
   a rotor blade coupled to the hub; and
   a constant velocity (CV) joint coupled between the drive shaft and the hub, the CV joint comprising:
      a first yoke rotatably coupled to the drive shaft about a first axis and configured to receive the drive shaft through a first opening;
      a second yoke rotatably coupled to the first yoke about a second axis and rotatably coupled to the hub about a third axis; and
      a control mechanism adapted to constrain the first yoke and the second yoke so as to achieve a substantially CV characteristic between the drive shaft and the hub, the control mechanism comprising a positioning portion adapted to position the first and second yokes such that the second axis substantially resides on a bisector of an angle between the drive shaft and the hub.

2. The rotorcraft of claim 1, wherein the control mechanism is positioned so as to allow the drive shaft to pass through the first opening.

3. The rotorcraft of claim 1, wherein the control mechanism is coupled to the drive shaft proximate the first opening.

4. The rotorcraft of claim 1, wherein the second yoke is disposed about the first yoke.

5. The rotorcraft of claim 1, wherein the hub is disposed about the drive shaft.

6. The rotorcraft of claim 1, wherein the first axis is substantially normal to an axis of rotation of the drive shaft.

7. The rotorcraft of claim 1, wherein the third axis is substantially normal to an axis of rotation of the hub.

8. The rotorcraft of claim 1, wherein the control mechanism further comprises a first linkage and a second linkage coupling the first linkage to the hub.

9. The rotorcraft of claim 1, wherein:
the first axis and the second axis substantially intersect at an origin point;
the control mechanism comprises a first linkage coupled to the drive shaft at a first point and extending through openings in the first and second yokes to a second point, the second point being positioned at an angle corresponding to the angle between the drive shaft and the hub; and
the first linkage is adapted to position the first and second yokes such that the second axis substantially resides on a bisector of the angle corresponding to the angle between the drive shaft and the hub.

10. The rotorcraft of Claim 1, wherein the positioning portion is configured to travel along an arc representing a range of bisection angles.

11. The rotorcraft of claim 1, wherein the control mechanism is operable to position the first and second yokes when the first and third axes are substantially collinear.

12. The rotorcraft of claim 11, wherein the control mechanism is operable to position the first and second yokes such that the second axis substantially resides on the bisector of the angle between the drive shaft and the hub when the first and third axes are substantially collinear.

13. A method of achieving a substantially constant velocity (CV) characteristic between an input device and an output device, comprising:
receiving the input device through a first opening in a first yoke, the first yoke rotatably coupled to the input device about a first axis and rotatably coupled to a second yoke about a second axis, the second yoke rotatably coupled to the output device about a third axis; and
constraining the first yoke and the second yoke so as to achieve a substantially CV characteristic between the drive shaft and the hub, wherein constraining the first and second yoke comprises positioning the first and second yokes such that the second axis substantially resides on a bisector of an angle between the input device and the output device.

14. The method of claim 13, wherein constraining the first yoke and the second yoke comprises constraining an orientation of the second axis.

15. The method of claim 13, wherein the second yoke is disposed about the first yoke.

16. The method of claim 13, wherein the output device is disposed about the input device.

17. The method of claim 13, wherein the first axis is substantially normal to an axis of rotation of the input device.

18. The method of claim 13, wherein the third axis is substantially normal to an axis of rotation of the output device.

19. The method of claim 13, wherein constraining the first and second yoke comprises positioning the first and second yokes when the first and third axes are substantially collinear.

20. A constant velocity (CV) joint comprising:
a first yoke configured to be rotatably coupled to an input device about a first axis and configured to receive the input device through a first opening;
a second yoke rotatably coupled to the first yoke about a second axis and rotatably coupled to an output device about a third axis; and
a control mechanism adapted to constrain the first yoke and the second yoke so as to achieve a substantially CV characteristic between the input device and the output device, the control mechanism comprising a positioning portion adapted to position the first and second yokes such that the second axis substantially resides on a bisector of an angle between the input device and the output device.

21. The CV joint of claim 20, wherein the control mechanism is positioned so as to allow the input device to pass through the first opening.

22. The CV joint of claim 20, wherein the control mechanism is configured to be coupled to the input device proximate the first opening.

23. The CV joint of claim 20, wherein the second yoke is disposed about the first yoke.

24. The CV joint of claim 20, wherein the first axis is substantially normal to an axis of rotation of the input device.

25. The CV joint of claim 20, wherein the third axis is substantially normal to an axis of rotation of the output device.

26. The CV joint of claim 20, wherein the control mechanism further comprises a first linkage and a second linkage configured to couple the first linkage to the output device.

27. The CV joint of claim 20, wherein:
the first axis and the second axis substantially intersect at an origin point;
the control mechanism comprises a first linkage coupled to the input device at a first point and extending through openings in the first and second yokes to a second point, the second point being positioned at an angle corresponding to the angle between the drive shaft and the hub; and
the first linkage is adapted to position the first and second yokes such that the second axis substantially resides on a bisector of the angle corresponding to the angle between the drive shaft and the hub.

28. The CV joint of claim 20, wherein the positioning portion is configured to travel along an arc representing a range of bisection angles.

29. The CV joint of claim 20, wherein the control mechanism is operable to position the first and second yokes when the first and third axes are substantially collinear.

30. The CV joint of claim 29, wherein the control mechanism is operable to position the first and second yokes such that the second axis substantially resides on the bisector of the between the drive shaft and the hub when the first and third axes are substantially collinear.

* * * * *